US012680806B2

(12) United States Patent (10) Patent No.: US 12,680,806 B2
Dolby et al. (45) Date of Patent: Jul. 14, 2026

(54) CONTACTLESS DETECTION OF VIBRATIONS IN METAL BELTS

(71) Applicant: Primetals Technologies Germany GmbH, Erlangen (DE)

(72) Inventors: Mark Dolby, Dorset (GB); Simon Hain, Erlangen (DE); David Terry, Dorset (GB)

(73) Assignee: Primetals Technologies Germany GmbH (DE)

( * ) Notice: Subject to any disclaimer, the term of this patent is extended or adjusted under 35 U.S.C. 154(b) by 326 days.

(21) Appl. No.: 18/687,797

(22) PCT Filed: Aug. 22, 2022

(86) PCT No.: PCT/EP2022/073347
§ 371 (c)(1),
(2) Date: Feb. 28, 2024

(87) PCT Pub. No.: WO2023/030949
PCT Pub. Date: Mar. 9, 2023

(65) Prior Publication Data
US 2024/0384977 A1 Nov. 21, 2024

(30) Foreign Application Priority Data
Aug. 30, 2021 (EP) ..................................... 21193744

(51) Int. Cl.
*G01B 7/34* (2006.01)
*B21B 38/02* (2006.01)
(52) U.S. Cl.
CPC .............. *G01B 7/345* (2013.01); *B21B 38/02* (2013.01)
(58) Field of Classification Search
CPC .................................. G01B 7/34; G01B 7/345
(Continued)

(56) References Cited

U.S. PATENT DOCUMENTS

| | | | |
|---|---|---|---|
| 3,502,968 A | | 3/1970 | Tobin, Jr. et al. |
| 3,585,495 A | * | 6/1971 | Kubo ...................... B21B 38/02 |
| | | | 324/234 |

(Continued)

FOREIGN PATENT DOCUMENTS

| | | |
|---|---|---|
| CN | 201006548 Y | 1/2008 |
| CN | 101264485 A | 9/2008 |

(Continued)

OTHER PUBLICATIONS

Office Action mailed Jun. 10, 2025, issued in corresponding Japanese Patent Application No. 2024-510707 with English translation.
(Continued)

*Primary Examiner* — George B Bennett
(74) *Attorney, Agent, or Firm* — OSTROLENK FABER LLP

(57) ABSTRACT

A measuring assembly with a mechanical excitation device that excites the metal belt of a transport device at an excitation frequency (fA) to produce mechanical vibrations. Analog measurement signals (MA) characterizing the amplitude (A) of the excited mechanical vibrations are detected for corresponding regions of the metal belt using sensor elements. The measurement signals (MA) are digitized with digitization devices and the digitized measurement signals or signals derived therefrom are transmitted from the digitization devices to an evaluation device arranged outside of the measuring assembly as transmitted signals (MA'). The sensor elements comprise eddy current sensors. The eddy current sensors, which directly adjoin one another when viewed in the width direction, are operated using different operating frequencies (f1, f2, f3). When the sensor elements are viewed as a whole, a plurality of sensor elements are operated using the same operating frequency (f1, f2, f3).

16 Claims, 12 Drawing Sheets

(58) Field of Classification Search
USPC .................................... 33/533, 732, 733, 744
See application file for complete search history.

(56)                    References Cited

U.S. PATENT DOCUMENTS

| | | | | |
|---|---|---|---|---|
| 3,850,031 A | | 11/1974 | Schwenzfeier et al. ........ 73/143 | |
| 4,309,902 A | * | 1/1982 | Sano ....................... B21B 38/02 | |
| | | | | 73/159 |
| 4,677,578 A | | 6/1987 | Wright et al. | |
| 4,794,773 A | * | 1/1989 | Bradlee .................. G01B 7/345 | |
| | | | | 83/72 |
| 4,851,760 A | * | 7/1989 | Luebke .................... G01B 7/28 | |
| | | | | 340/870.37 |
| 6,289,750 B1 | | 9/2001 | Baumann et al. | |
| 6,357,301 B1 | | 3/2002 | Berghs et al. | |
| 9,243,933 B2 | | 1/2016 | Lehmann et al. | |
| 10,081,041 B2 | * | 9/2018 | Burger .................... B21B 38/02 | |

FOREIGN PATENT DOCUMENTS

| | | | | | |
|---|---|---|---|---|---|
| CN | 104550264 A | | 4/2015 | | |
| DE | 19707691 A1 | | 8/1998 | | |
| DE | 19839286 A1 | | 3/2000 | | |
| EP | 0064216 A2 | | 11/1982 | | |
| EP | 2753899 B1 | | 1/2018 | | |
| EP | 4032629 A1 | * | 7/2022 | ............ | G01B 7/107 |
| JP | S50-11476 A | | 5/1975 | | |
| JP | H07-27535 A | | 1/1995 | | |
| WO | WO 9838482 A1 | | 9/1998 | | |
| WO | WO 2018096120 A1 | | 5/2018 | | |

OTHER PUBLICATIONS

International Search Report mailed Nov. 25, 2022 in corresponding PCT International Application No. PCT/EP2022/073347.

* cited by examiner

CONTACTLESS DETECTION OF VIBRATIONS IN METAL BELTS

CROSS-REFERENCE TO RELATED APPLICATIONS

The present application is a 35 U.S.C. §§ 371 national stage application of International Application No. PCT/EP2022/073347, filed Aug. 22, 2022, which claims priority to European Patent Application No. 21193744.6, filed Aug. 30, 2021, the contents of which are incorporated herein by reference.

TECHNOLOGICAL FIELD

The present invention is based on a measuring assembly in a transport device for a metal belt, wherein the measuring assembly is arranged between a front device and a rear device arranged downstream of the front device of the transport device, wherein the measuring assembly has a mechanical excitation device by means of which the metal belt is excitable in its thickness direction at an excitation frequency to produce a mechanical vibration, wherein the measuring assembly has a plurality of sensor elements, wherein the sensor elements are arranged offset in relation to one another when viewed in the width direction of the metal belt, wherein an analog measurement signal which is characteristic of the amplitude of the excited mechanical vibration of the respective region of the metal belt is detectable in each case by means of the sensor elements for a plurality of regions of the metal belt which are offset in relation to one another in the width direction, wherein digitization devices are arranged inside the measuring assembly, by means of which the detected analog measurement signals are digitized and of which the digitized measurement signals or signals derived therefrom are transmitted as transmitted signals to an evaluation device arranged outside the measuring assembly.

The present invention is further based on a combination of a measuring assembly of this type with an evaluation device, wherein the evaluation device in each case determines the amplitude of the vibration of the corresponding region of the metal belt during an evaluation of signals transmitted to it for regions of the metal belt offset in relation to one another in the width direction of the metal belt.

PRIOR ART

A measuring assembly of this type is known. Reference can be made purely by way of example to DE 197 06 691 A1. The flatness of the metal belt can be determined from the detected amplitudes of the mechanical vibrations of the regions of the metal belt. This is also explained in detail in the aforementioned DE document.

A measuring assembly in a transport device for a metal belt, said measuring assembly being arranged between a front device and a rear device arranged downstream of the front device of the transport device is known from the scientific paper entitled "Non-contact measurement of strip flatness", Steel Times International, July/August 2003, pages 16 and 17. The measuring assembly has a mechanical excitation device by means of which the metal belt is excitable in its thickness direction at an excitation frequency to produce a mechanical vibration. The measuring assembly further has a plurality of sensor elements which are arranged offset in relation to one another when viewed in the width direction of the metal belt. An analog measurement signal which is characteristic of the amplitude of the excited mechanical vibration of the respective region of the metal belt is detectable in each case by means of the sensor elements for a plurality of regions of the metal belt which are offset in relation to one another in the width direction, The detected signals are fed in analog form via coaxial cables to a digitization device which is arranged close to the rolling line. The data are forwarded from there to an evaluation device. The coaxial cables which connect the sensors to the electronics can have a maximum length of 9 m. Similar disclosure content can be found in WO 98/38482 A1 and DE 198 39 286 A1.

A measuring assembly in a transport device for a metal belt, said measuring assembly being arranged between a front device and a rear device arranged downstream of the front device of the transport device is known from U.S. Pat. No. 3,502,968 A. The measuring assembly has a plurality of sensor elements which are arranged offset in relation to one another when viewed in the width direction of the metal belt. An analog measurement signal is detectable in each case by means of the sensor elements for a plurality of regions of the metal belt offset in relation to one another in the width direction. The measuring assembly has a coil by means of which the metal belt is deflectable in its thickness direction. A constant voltage is applied to this coil in order to set the distance between the metal belt and the measuring assembly.

A measuring assembly in a transport device for a metal belt, said measuring assembly being arranged between a front device and a rear device disposed downstream of the front device of the transport device is known from U.S. Pat. No. 4,677,578. The measuring assembly has a plurality of sensor elements which are arranged offset in relation to one another when viewed in the width direction of the metal belt. An analog measurement signal which is characteristic of the distance between the metal belt and the respective sensor element in the respective region is detected in each case by means of the sensor elements for a plurality of regions of the metal belt offset in relation to one another in the width direction. The signals appear to be preprocessed in analog form and also to be fed in analog form to a microprocessor. Only there do they appear to be digitized. No information can be found concerning the arrangement of the microprocessor. The sensor elements are operated in each case at a dedicated operating frequency.

SUMMARY OF THE INVENTION

The flatness of the rolled metal belt is an important quality feature in the rolling of metal belts. In particular, the occurrence of undulations in the rolled metal belt after rolling is to be avoided.

A measuring assembly of the aforementioned type, for example, can be used to capture corresponding measured values. Compared with conventional measuring assemblies, measuring assemblies this type offer the particular advantage that the signal detection is performed contactlessly, so there is no risk of damage to the metal belt. However, measuring assemblies of this type also have some disadvantages.

In practice, for example, the sensor elements are built into the metal plate in such a way that they end up flush with the upper side of the metal plate. As a result, the sensors of the sensor elements—i.e. those elements which detect the measurement signals—are surrounded laterally by the material of the metal plate. This results in signal attenuation. The detected measurement signals therefore have a relatively low level and therefore a relatively low signal-to-noise ratio (SNR). The detected measurement signals are further transmitted in practice as analog signals via cables to the evaluation device. Distortions due to the effects of temperature, crosstalk and other interference are possible due to the length of the cable. This impedes the evaluation of the detected measurement signals.

The object of the present invention is to provide facilities by means of which the disadvantages of the prior art are avoided.

This object is achieved by a measuring assembly having the claimed features. Advantageous designs of the measuring assembly according to the invention form the subject-matter of dependent claims.

A measuring assembly of the aforementioned type is designed according to the invention in such a way that the sensor elements comprise eddy current sensors, that the eddy current sensors of sensor elements that are arranged directly adjacent to one another when viewed in the width direction are operated in each case at one of two or three operating frequencies which differ from one another, and that the number of sensor elements is greater than the number of operating frequencies so that, when the sensor elements are viewed as a whole, a plurality of sensor elements are operated in each case at the same operating frequency.

The number of operating frequencies can be kept low as a result. In particular, the number of operating frequencies is lower than the number of sensor elements. Component diversity is minimized through the use of (only) two or three operating frequencies. Furthermore, although a plurality of sensor elements are operated according to the present invention at the same operating frequency, the sensors which are operated at the same operating frequency are nevertheless separated from one another by other sensor elements which are operated at a different operating frequency or two different operating frequencies.

According to the present invention, the measurement signals are digitized as early as possible so that they are subsequently highly resilient to all types of interference.

It is even possible for the analog-to-digital conversion to be performed inside the respective sensor element. However, it is preferred that the digitization devices are designed as elements which are separate from the sensor elements and which are connected to the sensor elements via cables inside the measuring assembly. However, the cables are relatively short. Their length is usually significantly less than 1 m, for example from around 20 cm to around 50 cm.

It is possible for additional processing of the analog measured values and/or the digitized measured values to be performed immediately before or after the digitization. This is possible, but not necessary, and is in many cases also inappropriate.

The cables are preferably hermetically sealed at the transition to the respective sensor element. The term "hermetically sealed" means an airtight and watertight seal. In particular, the cables can be inseparably connected to their respective sensor element in order to create a seal of this type. As a result, the transition from the sensor elements to the cables is well protected against environmental influences (in particular water penetration). The inseparable connection between the cables and the sensor elements is particularly practicable since the cables are only relatively short. This represents a departure from the prior art in which the cables are fed to a switch cabinet outside the measuring assembly and are therefore several meters long.

The digitization devices are preferably disposed below a metal plate in which the sensor elements are arranged. The digitization devices can thereby be arranged in a space-saving but nevertheless well-protected manner.

The transmitted signals are preferably transmitted to the evaluation device via a common armored cable having prefabricated connections. This is advantageous, particularly in the harsh environment of rolling mills. Suitable armored cables are designed in the form of hydraulic hoses. Armored cables of this type (including the prefabricated connections) are available, for example, from the company Harting in Vienna (Austria).

It is possible for the armored cables in each case to comprise dedicated lines for the transmitted signals of the individual sensor elements. However, it is quite particularly preferable for the armored cable in each case to comprise dedicated lines for the transmitted signals from groups of in each case a plurality of sensor elements. The number of lines and also the dimensions and the complexity of the armored cable as a whole can be kept low as a result.

The sensor elements preferably have a coding which is characteristic of the operating frequency of the respective sensor element. The coding is such it that is immediately perceptible to human sensory organs. As a result, the sensor elements can be quickly and simply distinguished from one another by an operating person so that an installation of the sensor elements at the "correct" locations on the metal plate is guaranteed. The coding can be of a mechanical and/or haptic and/or optical nature as required. In the case of a mechanical coding, it is even possible in some instances to ensure that an installation of a sensor element at an "incorrect" location on the metal plate is impossible.

Alternatively or additionally, it is possible, for example, for an evaluation device to check the operating frequency at which the sensor elements in each case operate. In this case, if the evaluation device has stored information designating the sensors and the operating frequency at which they are intended to operate, the check can be carried out by the evaluation device and an error message can be output in the event of an error.

The object is further achieved by a combination of a measuring assembly according to the invention with an evaluation device according to the claimed features. Advantageous designs of this combination form the subject-matter of dependent.

According to the invention, a combination of a measuring assembly according to the invention with an evaluation device is created, in which the evaluation device receives the transmitted signals from the digitization devices, determines the amplitude of the excited mechanical vibration of the respective region of the metal belt on the basis of the transmitted signals for the respective range of the metal belt, and in determining the amplitudes, uses a characteristic which is at least specific to the metal belt.

By taking account of the characteristic, the transmitted signals can be linearized and the amplitudes of the vibrations of the regions of the metal belt can then be determined on the basis of the linearized signals. Due to the circumstance that the characteristic is determined specifically for the metal belt (for example depending thickness, its temperature and/or its material), an improved linearization on one hand, and a linearization within a greater measurement range on the other hand compared with prior art are possible.

Additionally, it is possible that the characteristic is also dependent on the operating temperature of the sensor elements. The linearization of the transmitted signals can be even further improved as a result.

The evaluation device preferably uses a Goertzel algorithm to determine the amplitudes. This algorithm enables a faster and better evaluation of the transmitted signals. This applies quite particularly if the evaluation device takes account of the excitation frequency within the Goertzel algorithm.

BRIEF DESCRIPTION OF THE DRAWINGS

The characteristics, features and advantages of this invention described above and the manner in which they are achieved will become clearer and more readily understandable in connection with the following description of the example embodiments which are explained in detail with reference to the drawings. Here, in a schematic view.

DESCRIPTION OF THE EMBODIMENTS

Figure 1:
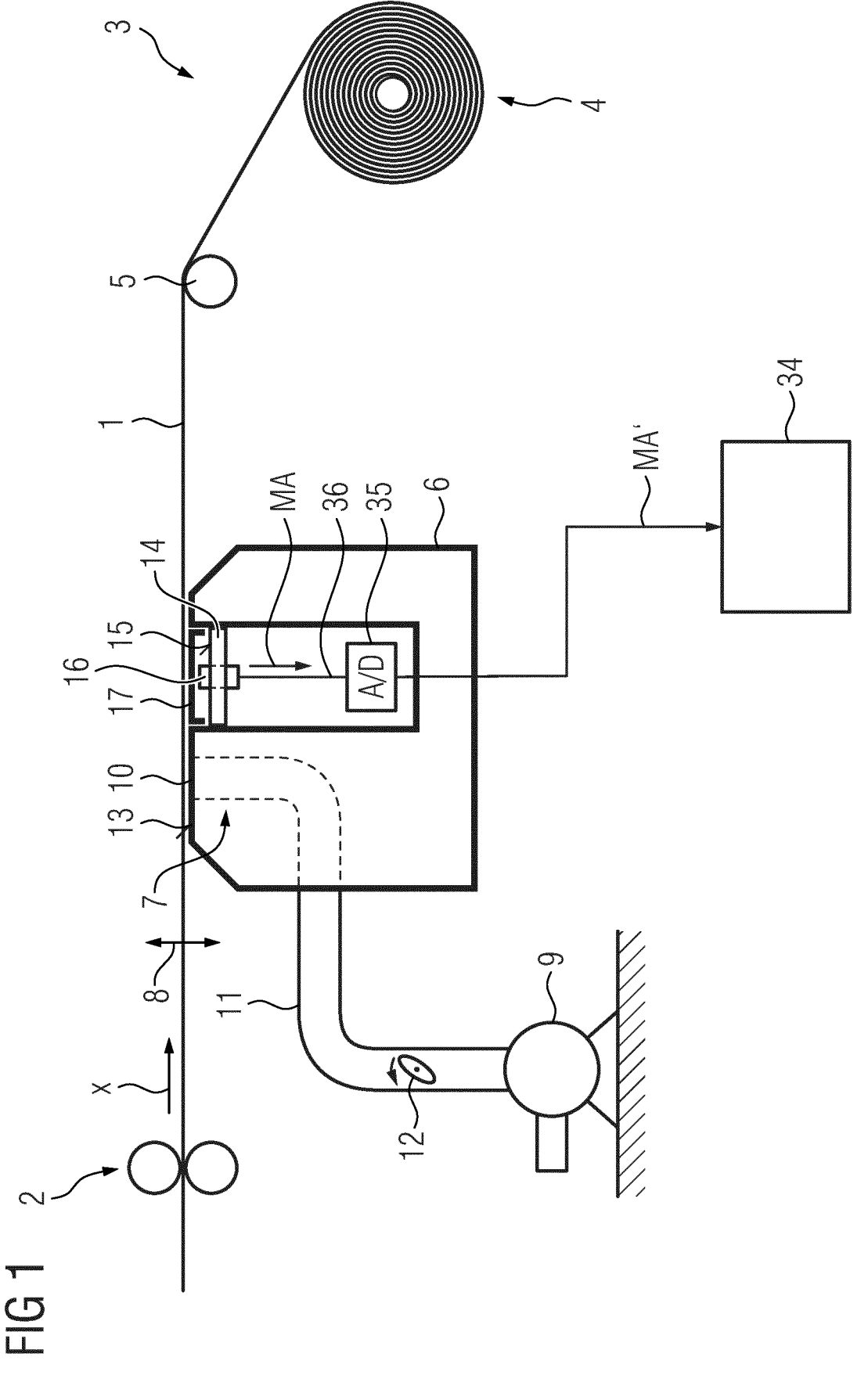
FIG. 1 shows a side view of a rolling device.

According to FIG. 1, a transport device for a metal belt 1 has a front device 2. The front device is normally a mill stand. Only the working rollers of the mill stand are shown in FIG. 1. However, the mill stand often has additional rollers, for example supporting rollers in addition to the working rollers in the case of a four-high mill stand, and intermediate rollers and supporting rollers in addition to working rollers in the case of a six-high mill stand. Other designs are also possible, for example in the form of a 20-roller mill stand or a 12-roller mill stand.

A further mill stand can be disposed upstream of the mill stand on the inlet side. A plurality of further mill stands can also be disposed upstream of the mill stand on the inlet side. It is similarly possible for a reel device to be disposed, for example, directly upstream of the mill stand in order to reel off the metal belt 1. The front device 2 itself can also be a device other than a mill stand. Examples of devices of this type are a set of driving rollers and a reel. The design that is implemented is of minor importance in the context of the present invention. For this reason, the design of the rolling device on the inlet side of the front device 2 is also not shown in the figure and is also not explained in detail.

The transport device further has a rear device 3. The rear device 3 is disposed downstream of the front device 2. As shown in FIG. 1, the rear device 3 can comprise, for example, a reel 4 and a deflection roller 5 disposed upstream of the reel 4. The specific design of the downstream device 3 is of minor importance. What is crucial here is that a passline for the metal belt 1 is defined by the front device 2 and the rear device 3, along which the metal belt 1 is transported in a transport direction x from the front device 2 to the rear device 3. The transport direction x is normally horizontal or at least more or less horizontal. The transport speed at which the metal belt 1 runs out from the front device 2 can be up to 400 m/min, sometimes even slightly higher, in the case where the front device 2 is designed as a mill stand.

Various devices which are of minor importance according to the invention, for example a thickness measuring device, can be arranged between the front device 2 and the rear device 3. What is crucial in the present case is that a measuring assembly 6 is arranged between the front device 2 and the rear device 3.

The measuring assembly 6 has a mechanical excitation device 7. The metal belt 1 can be excited in its thickness direction by means of the mechanical excitation device 7 to produce a mechanical vibration. The metal belt 1 is shown specifically in a central position by means of a continuous line in FIG. 1. The deflection from the central position is indicated by a double arrow 8 in FIG. 1. The excitation to produce the mechanical vibration is performed at an excitation frequency fA.

The mechanical excitation device 7 can be designed, for example as a suction device, as shown in FIG. 1. This design is well-established, robust and reliable.

Figure 2:
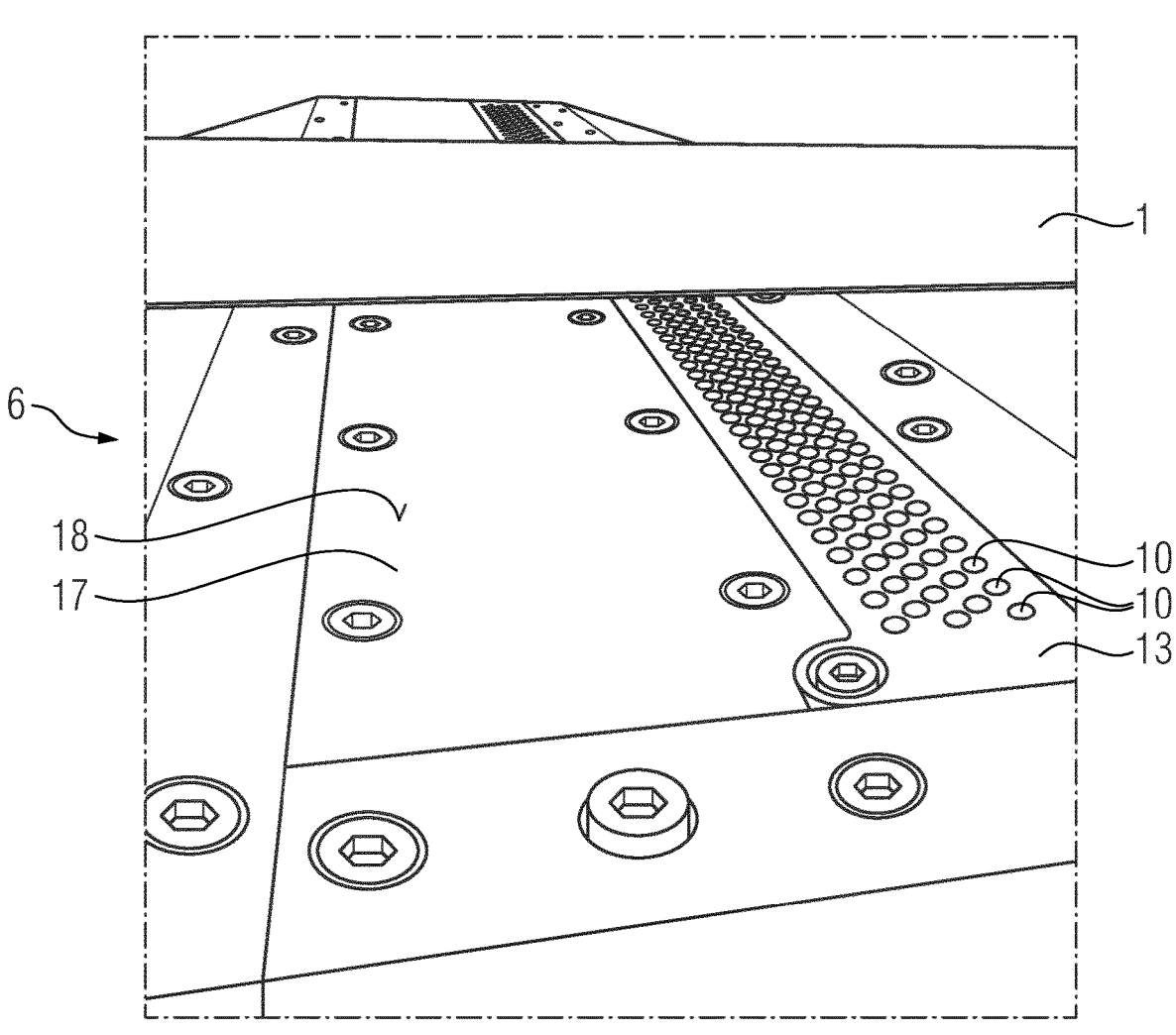
FIG. 2 shows a perspective side view of a metal belt and a measuring assembly.

A suction fan 9, for example, can extract air via suction openings 10 (see, in particular, FIG. 2 und 3; only a few of the suction openings 10 are denoted there with their reference sign) and a suction channel 11 from the region between the metal belt 1 and the measuring assembly 6, and can therefore periodically apply a negative pressure to one side of the metal belt 1. The extent to which air is extracted can be varied through direct control of the suction fan 9 and/or through control of a modulator element 12. In the case where the modulator element 12 is controlled, the modulator element 12 periodically varies the present cross section and therefore the flow resistance of the suction channel 11. The modulator element 12 can be designed, for example, as an oval or elliptical element which is rotated in the suction channel 11.

As already mentioned, this design is well-established. Detailed explanations are therefore not required here.

In order to cause the metal belt to vibrate effectively, the mechanical excitation device 7 has a flat boundary surface 13. The flat boundary surface 13 faces toward the metal belt 1 and runs at a short distance (usually in the single-digit millimeter range) from the passline. The suction openings 10 are arranged in the boundary surface 13.

Figure 3:
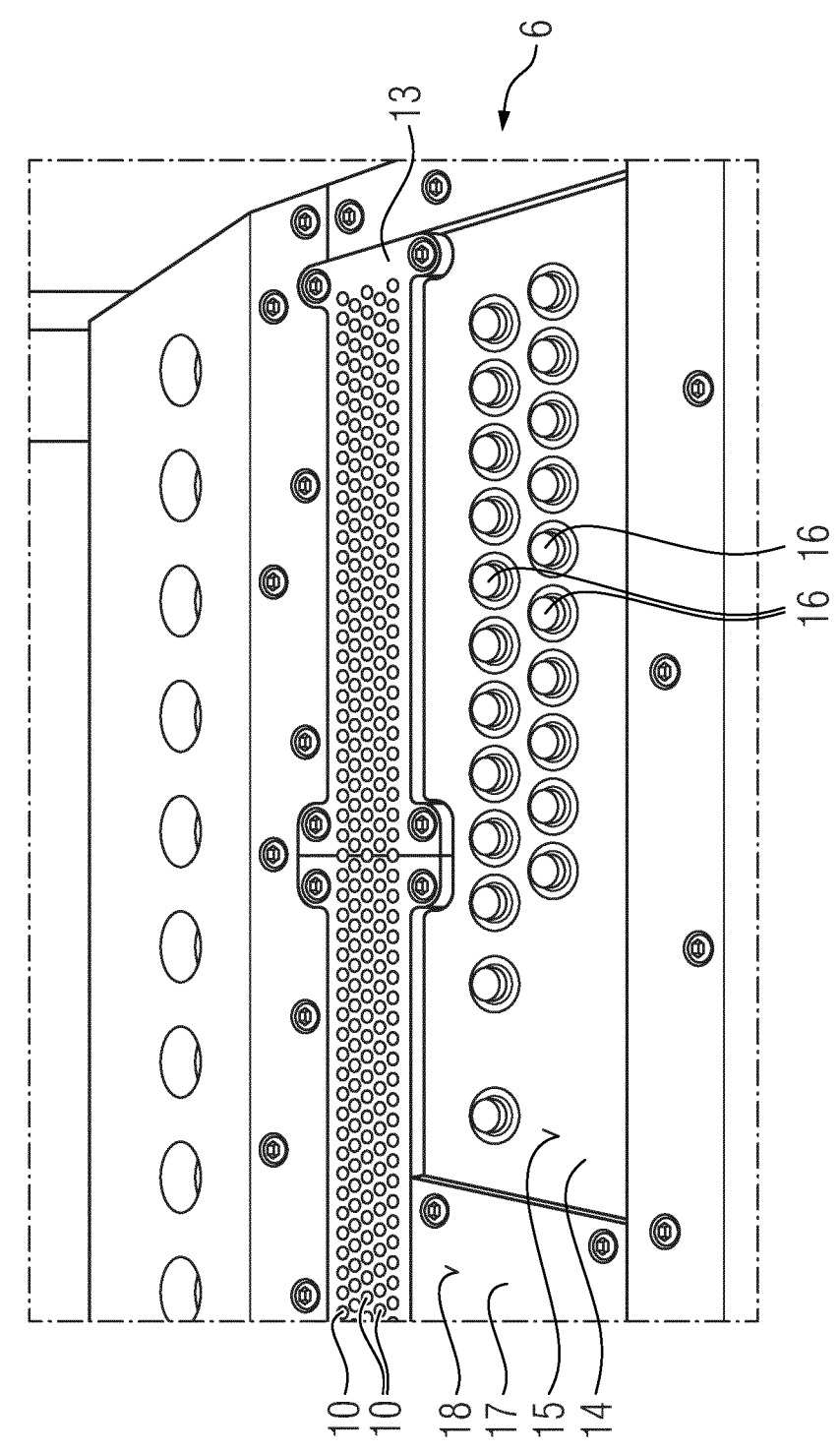
FIG. 3 shows a perspective view from above of a part of the measuring assembly from FIG. 2, wherein a cover is partially removed.
Figure 4:
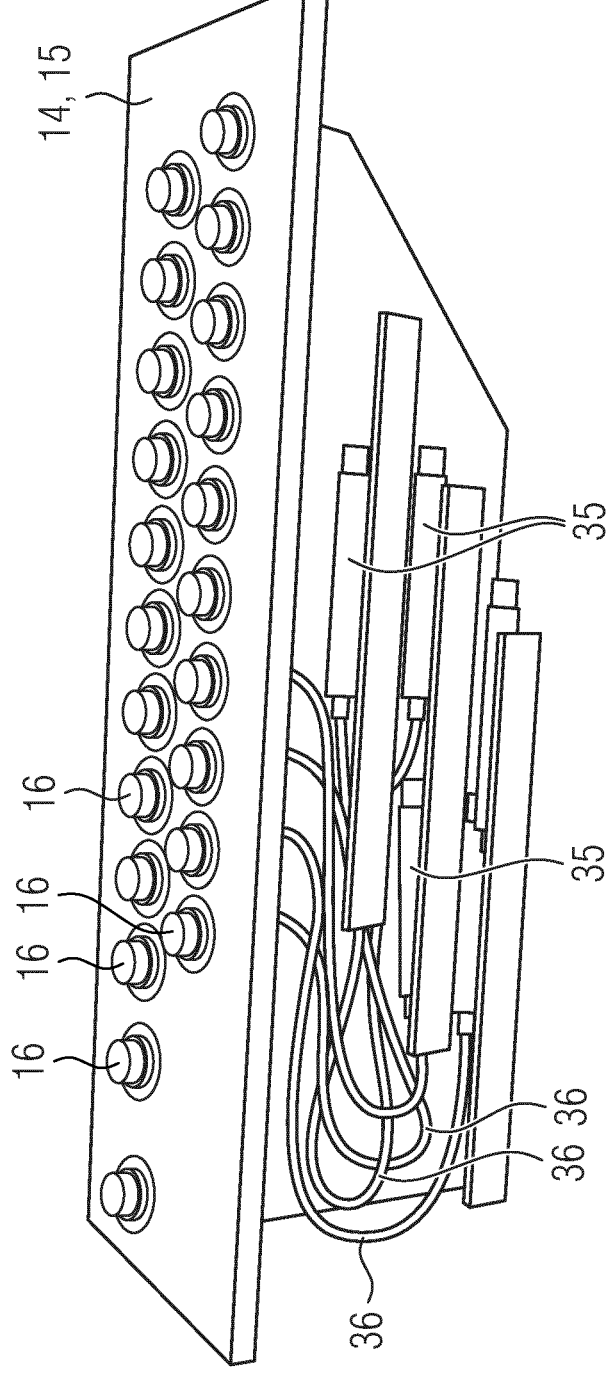
FIG. 4 shows a part of the measuring assembly from FIGS. 2 and 3.

The measuring assembly 6 further has a metal plate 14 as shown in FIGS. 3 and 4. The metal plate 14 is arranged next to the boundary surface 13. The metal plate 14 has an upper side 15 facing toward the metal belt 1. The metal plate 14 is offset in relation to the boundary surface 13 so that the upper side 15 has a greater distance from the passline than the boundary surface 13.

A plurality of sensor elements 16 are arranged in the metal plate 14 according to FIGS. 1, 3 and 4. The measuring assembly 6 therefore has this plurality of sensor elements 16. Only one of the sensor elements 16 is shown here in FIG. 1 for the sake of clarity. Only some of the sensor elements 16 are denoted with their reference sign in FIGS. 3 and 4. The sensor elements 16 clearly do not end up flush with the upper side 15 of the metal plate 14, but project beyond the upper side 15 toward the metal belt 1. The measuring assembly 6 therefore has a cover 17. The cover 17 covers the sensor elements 16 on their upper side (i.e. toward the metal belt 1). The cover 17 seals the sensor elements 16 on the sides of the sensor elements 16. According to FIG. 2, an upper side 18 of the cover 17 lies in the plane formed by the flat boundary surface 13.

The cover 17 consists of an electrically insulating material. The cover 17 can consist, for example, of a ceramic or a plastic. Suitable ceramics and suitable plastics, for example polyimides and polyester ether ketones (PEEK), are known to persons skilled in the art.

The sensor elements 16 are arranged offset in relation to one another viewed in the width direction of the metal belt 1. In the specific design of the present invention, the sensor elements 16 form two rows, wherein, when viewed in the width direction, the corresponding sensor elements 16 are arranged next to one another within the respective row and, when the rows are viewed as a whole, the sensor elements 16 of the rows are arranged offset in relation to the sensor elements 16 of the other rows when viewed in the width direction. This design, i.e. with a plurality of rows of sensor elements 16 and rows offset in relation to one another, is currently preferred, but, in the final analysis, is of minor importance.

A respective measurement signal MA can be detected by means of the sensor elements 16 for a respective region of the metal belt 1, wherein the respective measurement MA signal is characteristic of the amplitude A of the excited mechanical vibration of the respective region of the metal belt 1. The regions of the metal belt 1 are arranged offset in relation to one another, similarly in the width direction, according to the arrangement of the sensor elements 16.

Figure 5:
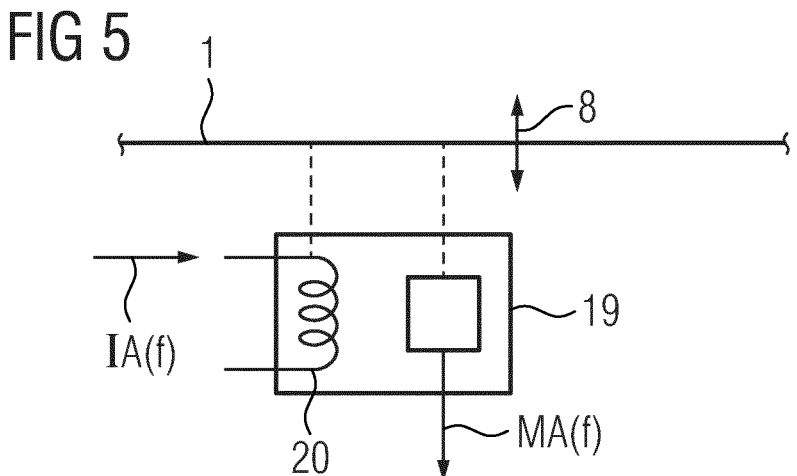
FIG. 5 shows a single sensor.

The detection of the respective measurement signal MA is performed contactlessly. Possible designs for this purpose are generally known to persons skilled in the art. The sensor elements 16 (=structural unit) specifically comprise eddy current sensors as the actual sensors 19 which detect the respective measurement signal MA. With an eddy current sensor—see FIG. 5 for one single eddy current sensor—an eddy current is induced by means of an excitation current IA of an excitation coil 20 in the respective region of the metal belt 1. The amount by which the eddy current is induced can be measured. The respective (analog) measurement signal MA is derived from this amount.

The excitation current IA has an excitation frequency f, referred to below as the operating frequency in order to distinguish it from the excitation frequency fA. The operating frequency f usually lies within the range of a few kHz, sometimes even in the single-digit MHz range. The measurement signal MA similarly has the operating frequency f. The respective present distance between the respective region of the metal belt 1 and the measuring assembly 6 can therefore be determined from the measurement signal MA in a manner known per se. The development of this distance over time provides the amplitude A of the mechanical vibration of the corresponding region of the metal belt 1.

This procedure is generally known and familiar to persons skilled in the art. It does not therefore need to be explained in detail.

Figure 6:
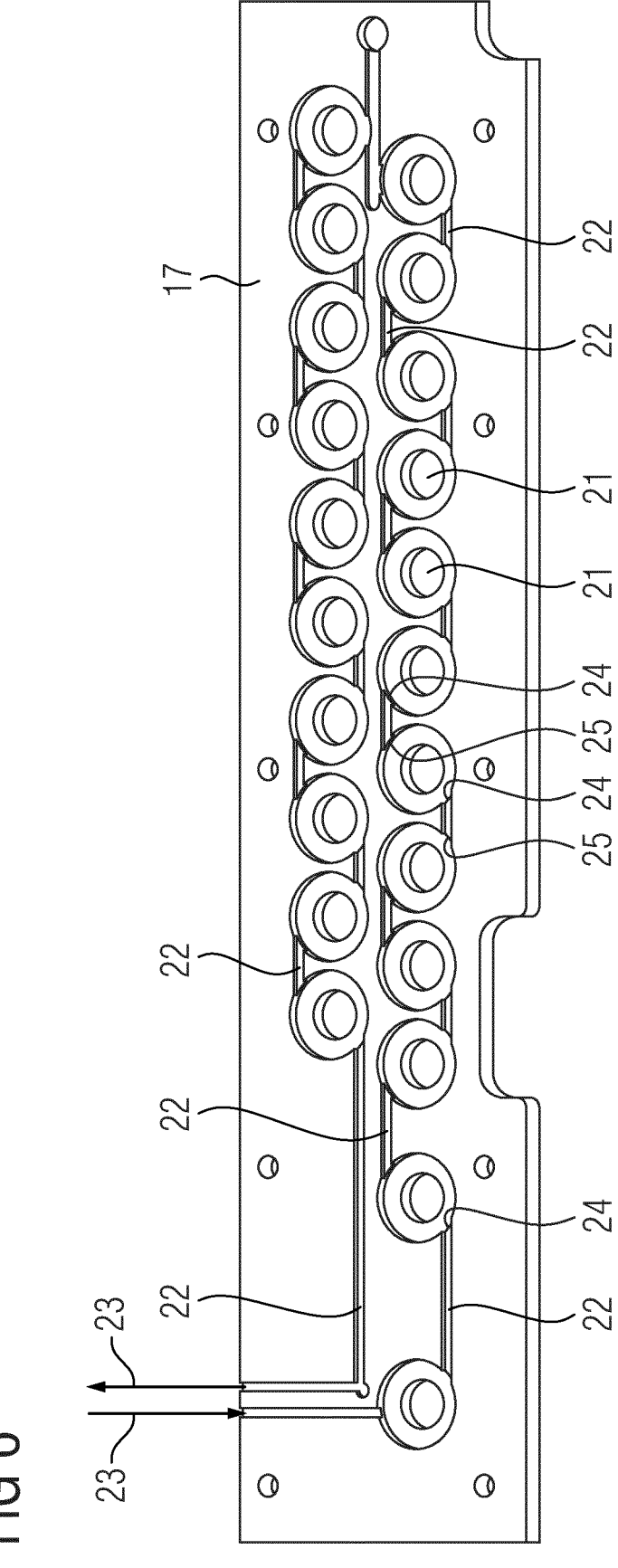
FIG. 6 shows a perspective view of an underside of a cover.

According to FIG. 6, the cover 17 has receptacles 21 on its underside, i.e. the side facing toward the sensor elements 16. The sensor elements 16 dip into the receptacles 21 when the cover 17 is mounted on the metal plate 14 (obviously only insofar as they project beyond the upper side 15 of the metal plate 14).

The cover 17 further has indents 22 on its underside. Only some of the indents 22 are denoted with their reference sign in FIG. 6. A number of flow channels for a cooling medium 23 are formed by the indents 22 as a whole between the metal plate 14 and the cover 17. The sensor elements 16 can therefore be actively cooled by means of the cooling medium 23.

One single flow channel is formed in the illustration according to FIG. 6. However, a plurality of flow channels could also be formed. The following descriptions of the sequence of sensor elements 16 relate to the respective flow channel. In the case of a plurality of flow channels, the flow channels are separated from one another. The sensor elements 16 are therefore incorporated in each case into only one single flow channel. In the case of a plurality of channels, the following statements apply to each flow channel considered individually.

According to FIG. 6, the flow channel is designed in such a way that the sensor elements 16 are arranged sequentially one after the other when viewed in the direction of flow of the cooling medium 23. The cooling medium 23 therefore first cools one of the sensor elements 16, then the next sensor element 16, then again the next sensor element 16, etc., until all sensor elements 16 of the respective flow channel are cooled.

FIG. 6 further shows that the receptacles 21 in each case have an inlet 24 for the cooling medium 23 and in each case have an outlet 25 for the cooling medium 23. In FIG. 6, for the sake of clarity, the inlets 24 and the outlets 25 are denoted with their reference sign for only some of the receptacles 21. On one hand, the outlet 25 of a respective receptacle 21 evidently has a communication connection via a respective connection section of the respective flow channel to the inlet 24 of the respective next receptacle 21. In this context, the term "next receptacle" refers to the next receptacle 21 when viewed in the direction of flow of the cooling medium 23. On the other hand, the inlet 24 and the outlet 25 of a respective receptacle 21 are arranged opposite one another when viewed from the respective sensor element 16. Consequently, the respective sensor element 16 is completely surrounded and therefore cooled by the cooling medium 23.

The cooling medium 23 can, for example, be (purified) compressed air. This design offers the additional advantage that minor leaks are uncritical. This is because the compressed air has a higher pressure than the ambient air. Despite the leakage, no foreign bodies can therefore infiltrate into the space covered by the cover 17. The cooling of the sensor elements 16 can nevertheless be maintained insofar as the leakage is sufficiently slight.

Figure 7:
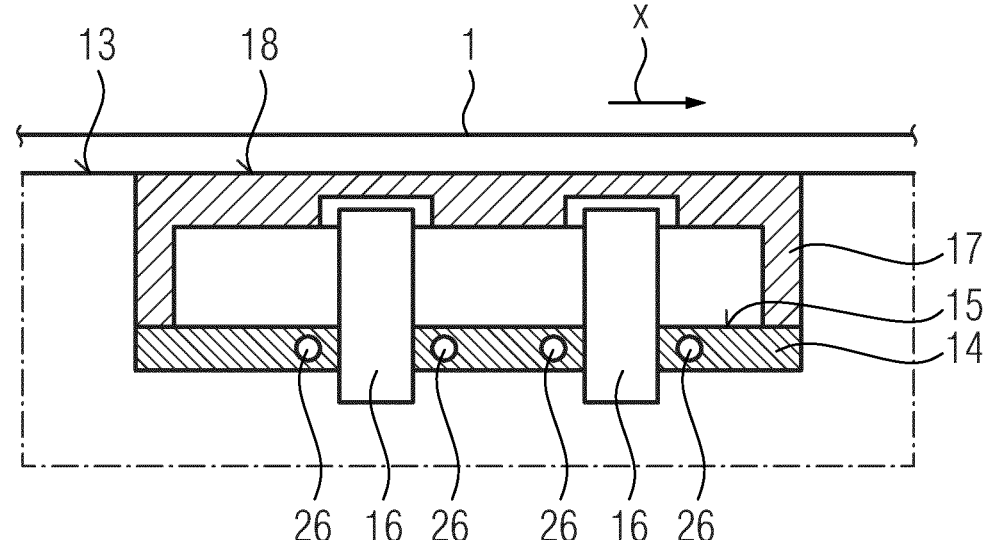
FIG. 7 shows a section through a metal plate and a cover.

In some cases, it can suffice to cool the sensor elements 16 exclusively with the cooling medium 23. In other cases, as shown in the schematic view in FIG. 7, it is necessary to arrange channels 26 for a cooling liquid in the metal plate 14. In this case, the metal plate 14 is cooled directly by the cooling liquid. The sensor elements 16 are also indirectly cooled as a result.

The design of a single sensor element 16 is explained in detail below in conjunction with FIGS. 8 and 9.

Figure 8:
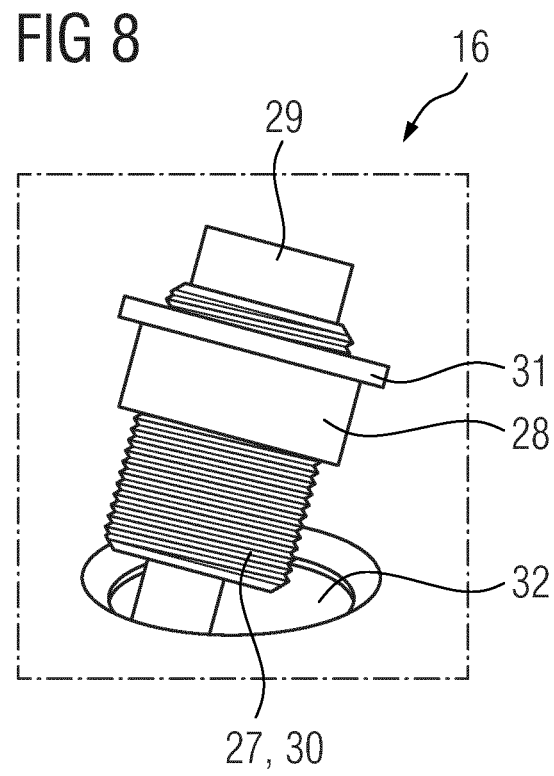
FIG. 8 shows a single sensor element.
Figure 9:
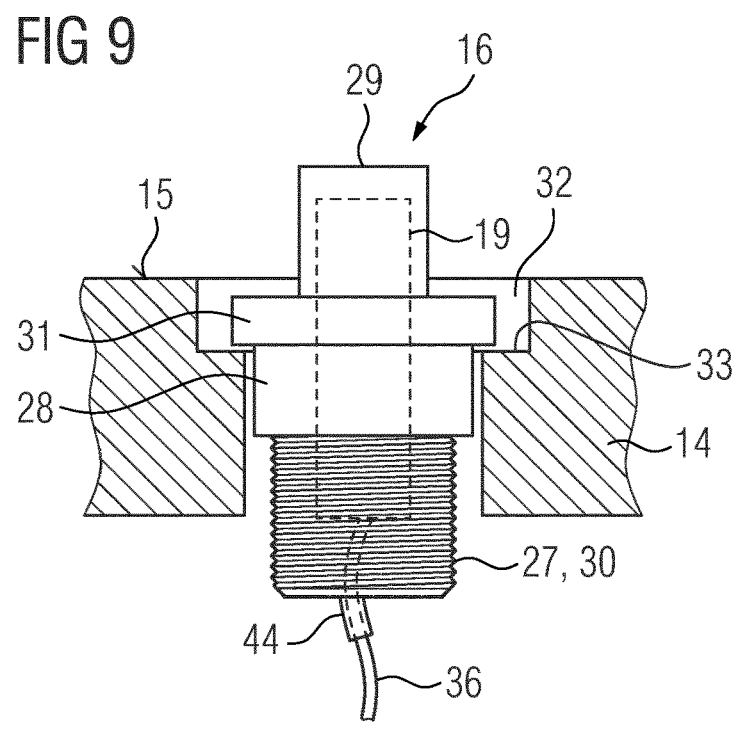
FIG. 9 shows a section of the metal plate, and a single sensor element.

According to FIGS. 8 and 9, the sensor elements 16 are prefabricated units consisting of a plurality of components.

These components are—in addition to the sensor 19 by means of which the respective measurement signal MA is detected—a bushing 27 and a fixing element 28. In addition, a plastic hood 29 can be fitted onto the sensor 19 itself on its side later facing toward the metal belt 1. The sensor 16 (insofar as it projects beyond the metal plate 14 in the mounted state) is provided with an airtight and watertight seal by means of the plastic hood 29 (insofar as it is present).

The sensor 19 (possibly including the plastic hood 27) is arranged in the bushing 27 as shown in FIG. 8. The bushing 27 for its part has an external thread 30. The fixing element 28 is attached to the bushing 27. The fixing element 28 therefore has a corresponding internal thread (not shown). The fixing element 28 has a collar 31 which projects radially outward in the radial direction.

The components, i.e. the sensor 19, the bushing 27 and the fixing element 28, are fixed relative to one another. The sensor 19 can, for example, be glued into the bushing 27 and the fixing element 28 can be fixed on the bushing 27 by means of solder points or weld points. When the sensor element 16 is mounted, the distance between the lower edge or the upper edge of the collar 31 and the upper side of the sensor 19 (or, if present, the upper side of the bushing 29) is thereby defined and set. The sensor 19, for example, can first be fixed in the bushing 27. The plastic hood 29 can be fitted onto the sensor 19 if necessary before or after. The distance between the upper edge or the lower edge of the collar 31 is then set. The fixing element 28 is then finally fixed on the bushing 27.

The metal plate 14 has—see in particular FIG. 9—receptacles 32 for the sensor elements 16. The receptacles 32 in turn each have a radially inwardly projecting support ring 33. When the corresponding sensor element 16 is mounted in the corresponding receptacle 32, the collar 31 therefore lies on the support ring 33.

As already explained above, a respective measurement signal MA can be detected by means of the sensor elements 16 for the regions of the metal belt 1. The detection is performed contactlessly by means of eddy current sensors. For this purpose, the eddy current sensors have excitation coils 20 to which excitation currents IA of several kHz, sometimes even in the single-digit MHz range, are applied. The detected measurement signals MA are initially analog.

Figure 10:
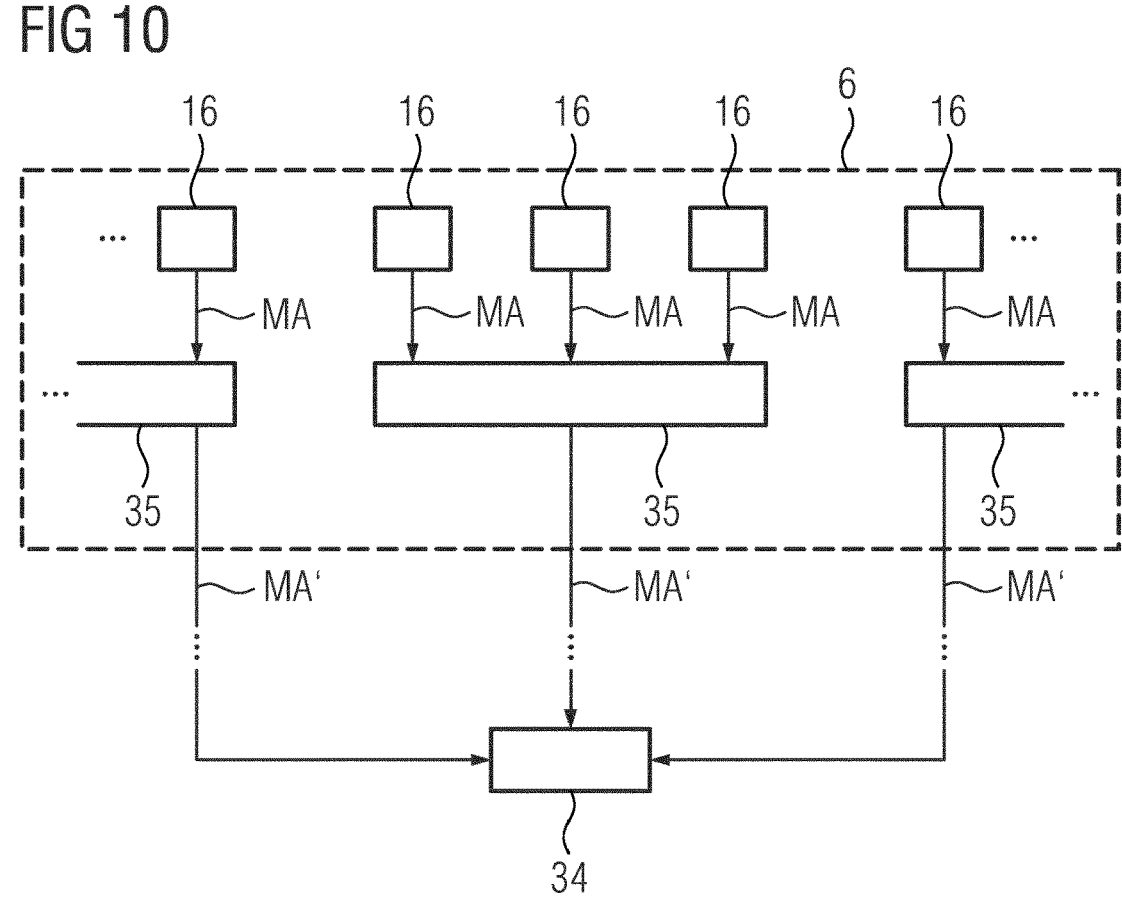
FIG. 10 shows sensor elements and digitization devices.

In the prior art, the measurement signals MA are transmitted via corresponding cables to an evaluation device 34 (see FIGS. 1 and 10) which is arranged outside the measuring assembly 6, normally in a switch cabinet. According to the present invention, however, digitization devices 35 are arranged inside the measuring assembly 6. FIG. 1 shows a single one of the digitization devices 35, and FIG. 10 shows a small number of the digitization devices 35. The detected analog measurement signals MA are digitized by means of the digitization devices 35.

The evaluation device 34 is arranged—as in the prior art—outside the measuring assembly 6, for example in a switch cabinet. In the simplest case, the digitization devices 35 transmit the digitized measurement signals themselves to the evaluation device 34 as transmitted signals MA'. Alternatively, the digitization devices 35 can transmit signals derived from the digitized measurement signals to the evaluation device 34 as transmitted signals MA'.

The arrangement of the digitization devices inside the measuring assembly 6 can according to requirements. The digitization devices 35 can be designed, for example, as independent elements separate from the sensor elements 16, as shown in FIGS. 1, 10, 11 and 12. In this case, the digitization devices 35 are connected inside the measuring assembly 6 via cables 36 to the sensor elements 16. With regard to their arrangement, the digitization devices 35 can be arranged, in particular, below the metal plate 14. The cables 36 are normally very short (usually a maximum of 100 cm, often even only 50 cm or less).

Figure 11:
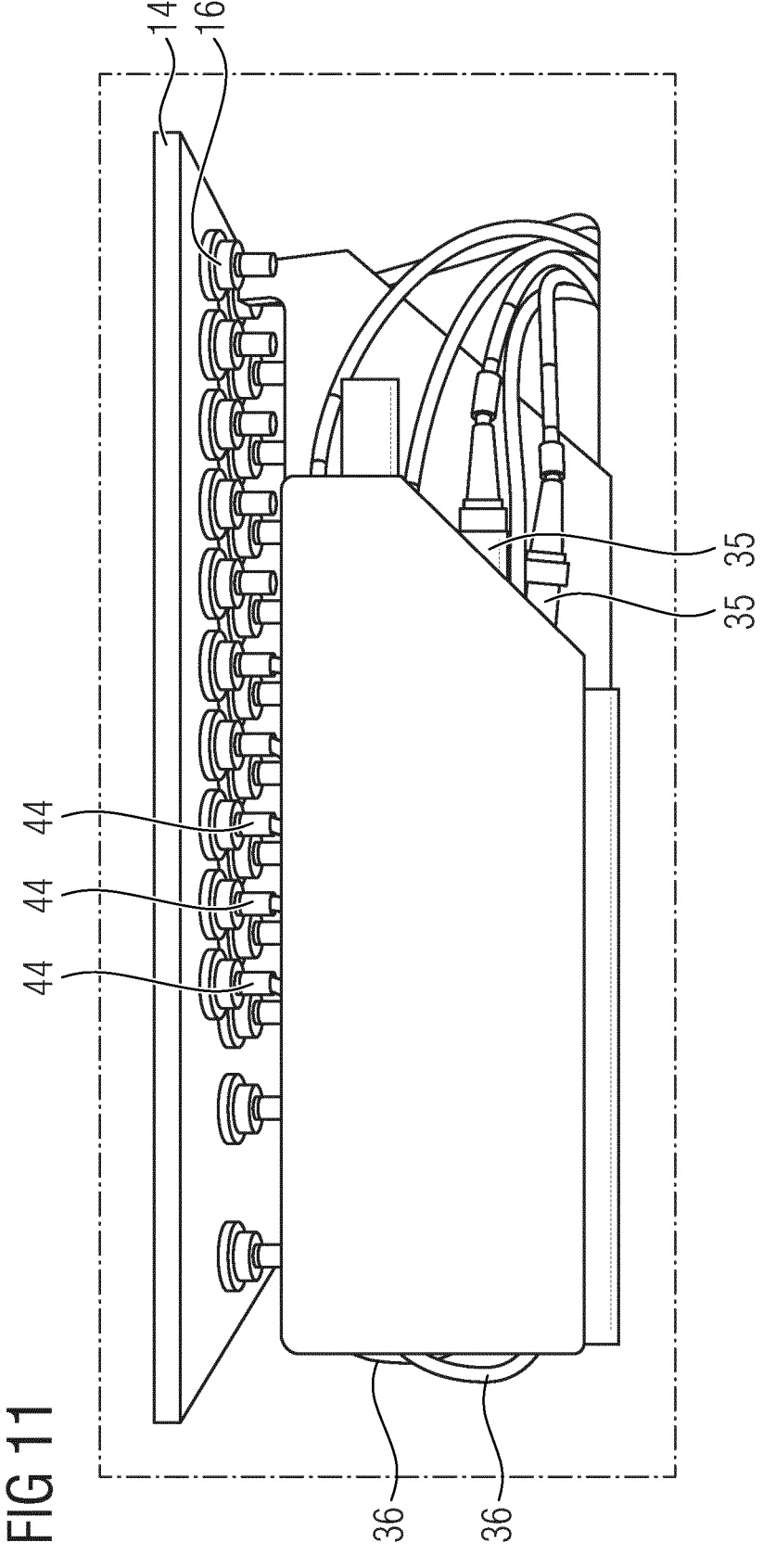
FIG. 11 shows an assembly unit which comprises a metal plate having sensor elements and digitization devices.
Figure 12:
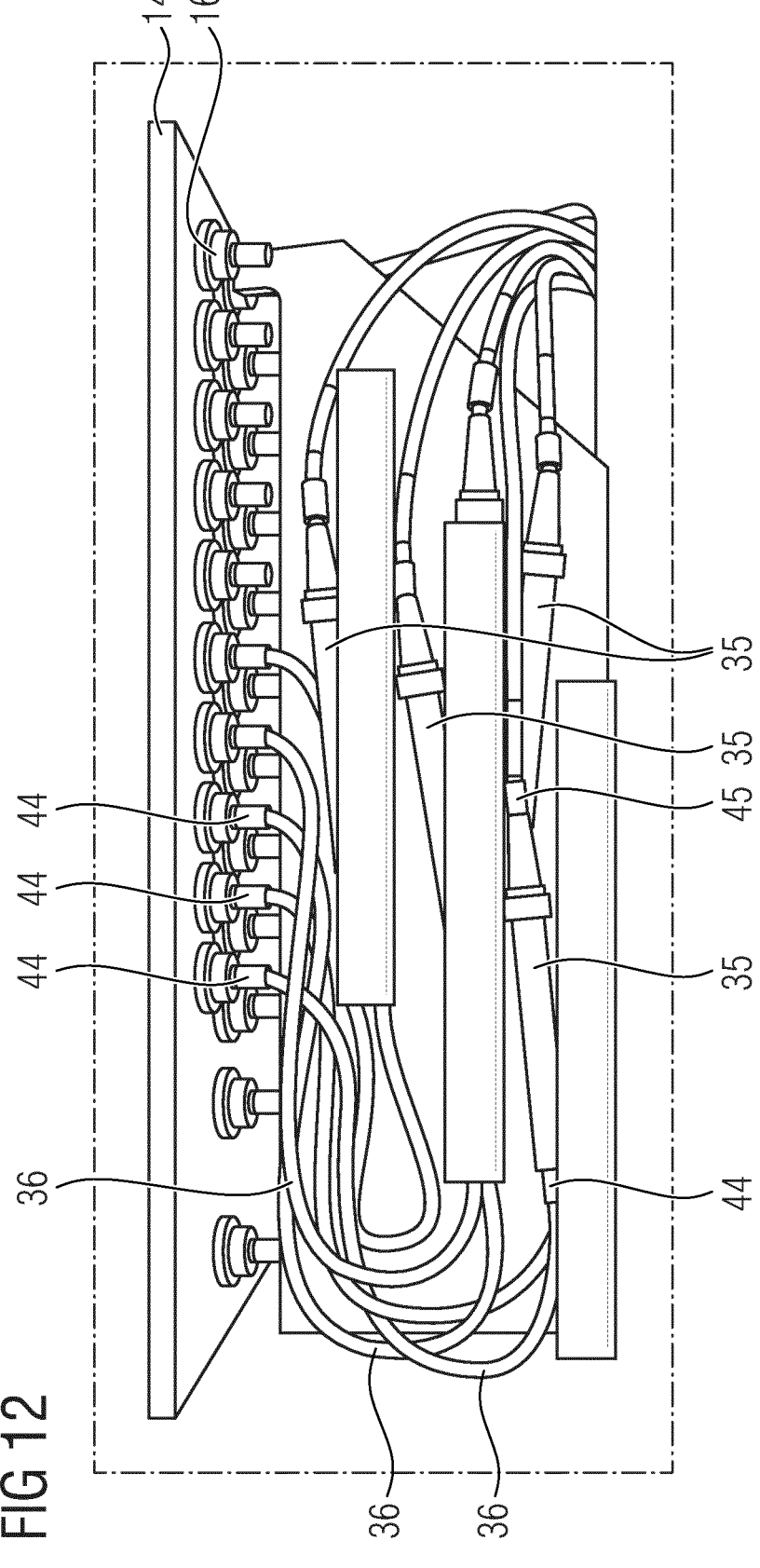
FIG. 12 shows the assembly unit from FIG. 11 with a removed cover plate.

The digitization devices 35 are shown in FIGS. 11 and 12—see additionally FIG. 4 also—as cigar-like elements. In this context, the term "cigar-like" refers not only to the fundamental shape (an elongated cylinder) but also to the absolute dimensions (length around 15 cm to 30 cm, diameter around 1.0 cm to 3.0 cm). This shape of the digitization devices 35 is currently preferred, but is in no way mandatory.

The cables 36 are normally detachably connected to the digitization devices 35, for example via a screw connection or a connection in the form of a bayonet fitting. The cables 36 are preferably hermetically sealed (i.e. airtight and watertight) at the transition to the sensor elements 16. The seal can be provided, for example, as is known in the case of motor vehicle engines for their spark plug connectors, by means of rubber-elastic cuffs which are movably arranged on the cable 36. Alternatively—and this is currently preferred—the cables 36 are inseparably connected to the respective sensor elements 16.

Figure 13:
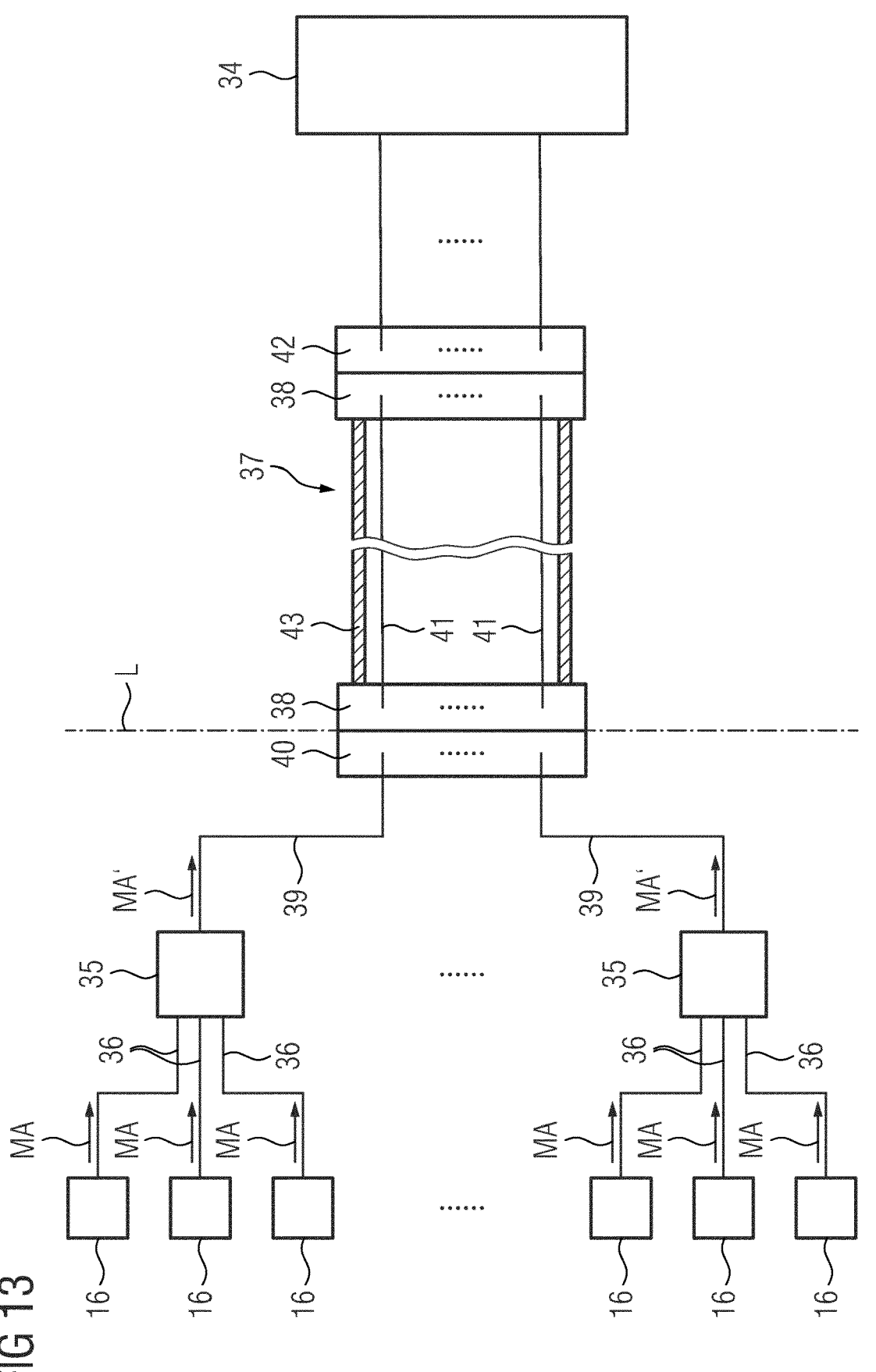
FIG. 13 shows a signal transmission method.

With regard to the connection of the digitization devices 35 to the evaluation device 34, it is possible in principle to establish the connection via individual corresponding connection cables, as this is done in the prior art for transmitting the analog measurement signals MA. However, it is preferred if the transmitted signals MA' are transmitted to the evaluation device 34 as shown in FIG. 13 via a common armored cable 37 having prefabricated connections 38. This is explained in detail below.

As shown in FIG. 13, single lines or thin cables 39 run from the digitization devices 35 to a prefabricated plug-in connection 40. One of the prefabricated connections 38 of the armored cable 37, said connection being arranged at one end of the armored cable 37, can be plugged into the prefabricated plug-in connection 40. Lines 41 corresponding to the individual lines or thin cables 39 are routed within the armored cable 37 to the other prefabricated connection 38 which is arranged at the other end of the armored cable 37. This prefabricated connection 38 is connected to a further plug-in connection 42, from which lines are routed to the evaluation device 34.

The armoring 43 of the armored cable 37 can correspond, for example, to the armoring normally found in hydraulic lines, the hydraulic fluid of which is under a pressure ranging from 100 bar to 500 bar.

The dotted line L in FIG. 13 is intended to indicate the boundary of the measuring assembly 6. As shown in FIG. 13, the armored cable 37 can therefore be connected from outside the measuring assembly 6 without having to open the measuring assembly 6. Alternatively, it is obviously also possible to arrange the prefabricated plug-in connection 40 inside the measuring assembly 6.

FIG. 13 also shows a further preferred design. In this design, the armored cable 37 in each case comprises dedicated lines 41 for the transmitted signals MA' from groups of in each case a plurality of sensor elements 16. Specifically, the digitized measurement signals from three sensor elements 16 are combined in each case in the digitization devices 35. The number "three" is of minor importance in this context.

Figure 14:
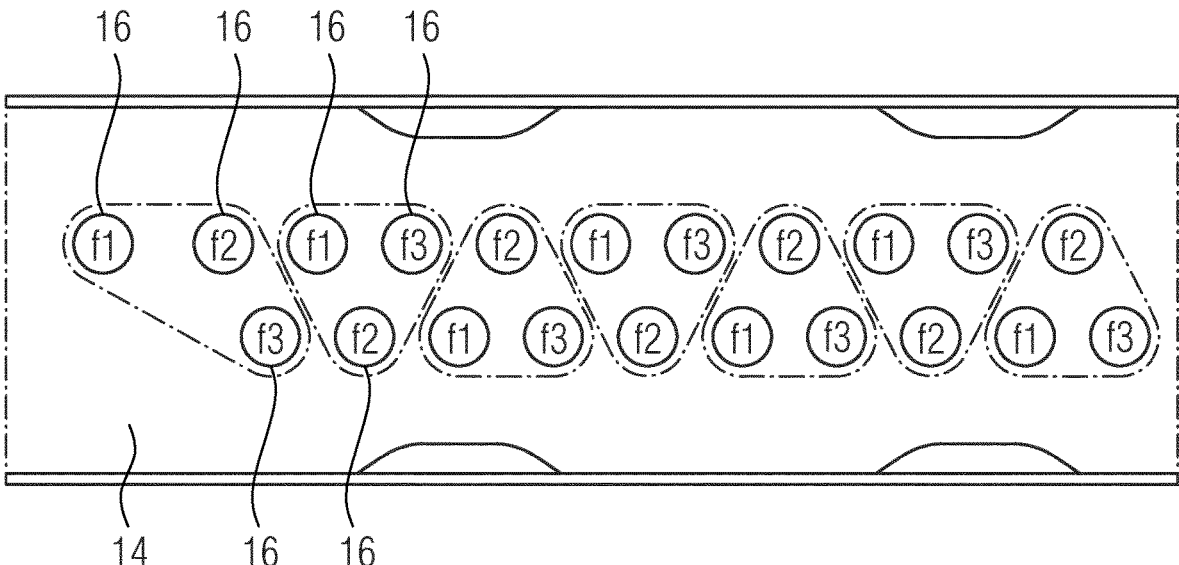
FIG. 14 shows an assignment of operating frequencies to sensor elements.

FIG. 14 shows schematically a top view of the sensor elements 16, i.e. as they are seen from the metal belt 1. Reference signs f1, f2 and f3 are included in the drawing.

Similar to the operating frequency f, the reference signs f1, f2 and f3 are likewise operating frequencies. However, they differ from one another in pairs. The operating frequency f1, for example, can have the value 280 kHz, whereas the operating frequency f2 has the value 300 kHz and the operating frequency f3 has the value 320 kHz.

The specified values are obviously given purely by way of example.

The eddy current sensors of sensor elements 16 which are arranged immediately adjacent to one another in the metal plate 14 are evidently operated at operating frequencies f1, f2, f3 which differ from one another. Any crosstalk can thus be significantly reduced.

In the case of operating frequencies f1, f2, f3 which differ from one another, it is further possible, as shown in FIGS. 13 and 14, for the number of sensor elements 16 of which the digitized measurement signals are transmitted via single lines of the lines 41 to be equal to the number of operating frequencies f1, f2, f3. In this case, in particular, the groups of the sensor elements 16 can be formed in such a way that each operating frequency f1, f2, f3 is in each case represented once in the groups. In FIG. 14, the corresponding groups are framed in each case by a dotted line.

In the case of operating frequencies f1, f2, f3 which differ from one another, the sensor elements 16 preferably have a coding 44, as shown in FIGS. 11 and 12 (see also FIG. 9 for one single sensor element 16). The coding 44 is characteristic of the operating frequency f1, f2, f3 of the respective sensor element 16. The coding 44 can be of an optical nature. Colors which differ from one another, for example, can be used for the different operating frequencies f1, f2, f3, for example red, green and blue or yellow, red and blue. The coding 44 can similarly be of a haptic nature. The operating frequency f1, for example, can be coded by means of a circumferential ring on the cable 36, whereas the operating frequencies f2 and f3 can be coded by means of two circumferential rings on the cable 36, wherein the operating frequency f2 and the operating frequency f3 can be distinguished from one another by the distance between the two rings. A further operating frequency f could be coded, for example, by means of three rings of this type. Similarly, a mechanical coding is also possible.

The digitization devices 15 preferably also have a corresponding coding 45, so that the correct assignment is also readily evident.

Figure 15:
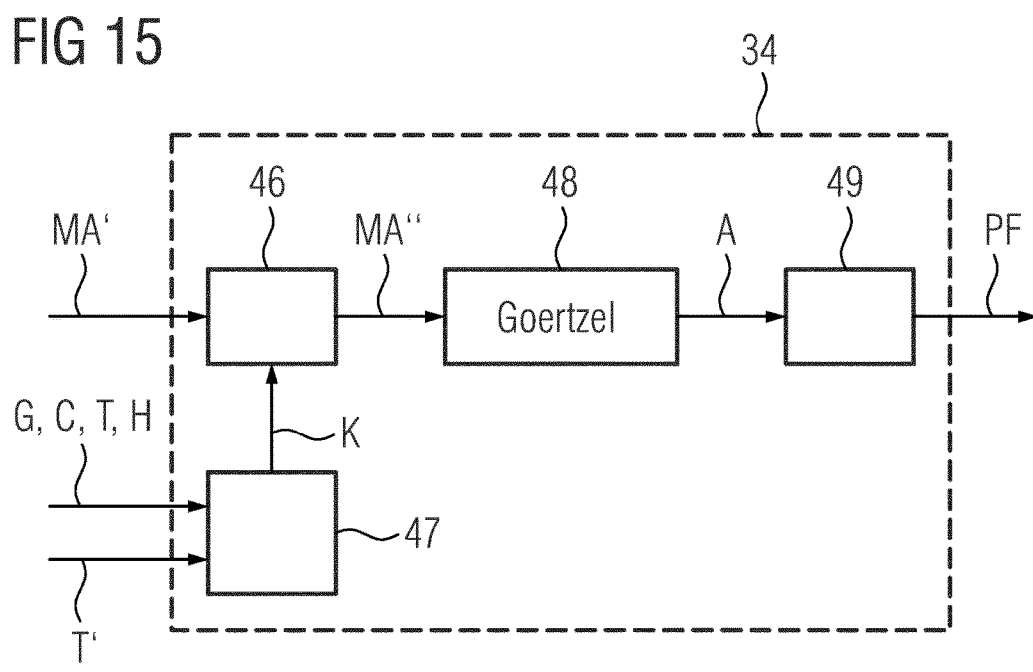
FIG. 15 shows a possible evaluation of transmitted signals.

As shown in FIG. 15, the evaluation device 34 receives the transmitted (digital) signals MA' from the digitization devices 35. During an evaluation of the transmitted signals MA', it determines the amplitude A of the mechanical vibration of the respective region of the metal belt 1.

In order to determine the amplitudes A, the evaluation device 34 first performs a linearization of the transmitted signals MA' in a linearization block 46. The linearization block 46 therefore outputs modified signals MA", the respective value of which is proportional to the corresponding deflection of the respective range of the metal belt 1 at the time when the corresponding (analog) measurement signal MA was detected. During the linearization, the evaluation device 34 evaluates a characteristic K. The characteristic K is determined by the evaluation device 34 specifically for the metal belt 1. The determination can be carried out, for example, depending on geometric characteristics G and/or chemical characteristics C and/or thermodynamic characteristics T (for example the temperature) and/or the history H of the metal belt 1. In addition, if necessary, an operating temperature T' of the sensor element 16 can also be taken into account during the determination of the characteristic K.

In order to determine the characteristic K, for example, the associated characteristics K for specific values of the geometric characteristics G, the chemical characteristics C, etc., can be stored in a determination device 47 so that the specifically used characteristic K can be determined through selection and/or interpolation.

The modified signals MA" are fed within the evaluation device 34 to a determination block 48. In the determination block 48, the evaluation device 34 determines the respective amplitude A of the excited mechanical vibration of the metal belt 1 for the regions of the metal belt 1. In determining the amplitudes A, the evaluation device 34 preferably uses a Goertzel algorithm, as shown in FIG. 15. It is quite particularly preferred that the evaluation device 34 takes account of the excitation frequency fA within the Goertzel algorithm.

The determined amplitudes A can be fed to a further determination block 49. In the determination block 49, the evaluation device 34 in each case determines a flatness error PF on the basis of the amplitudes A for the regions of the metal belt 1. The determination of the flatness error PF as such is no longer the subject-matter of the present invention.

The evaluation device 34 can output the determined flatness errors PF, for example to a control device (not shown) for the front device 2 so that the control device can activate flatness-correcting elements of the front device 2 in such a way that the flatness errors PF are eliminated as far as possible.

The present invention offers many advantages. The use of the cover 17 improves the sensitivity of the sensors 19. The replacement of the sensor elements 16 is significantly simplified. The positioning of the sensor elements 16 and the metal plate 14 can also be reliably and exactly guaranteed due to the design of the sensor elements 16 as prefabricated structural units. The same applies to the subsequent replacement of a defective sensor element 16 with a new sensor element 16.

The protection of the sensors 19 against moisture, dirt and, to a limited extent, also against substantial heat influx is also reduced due to the design of the sensor elements 16 as prefabricated structural units. The durability of the sensor elements 16 is thereby improved. At the same time, the cooling of the sensor elements 16 by means of the cooling medium 23 also provides improved protection against contamination and moisture. Crosstalk can be eliminated to the greatest possible extent through the use of a plurality of operating frequencies f1, f2, f3. Due to the very early digitization of the measurement signals MA even within the measuring assembly 6, the measuring signals MA can be converted very quickly into a form that is immune to interference. This enables, inter alia, an increase in the measurement range that can be evaluated. An improved evaluation and also an evaluation within an increased measurement range are similarly possible through the evaluation in conjunction with characteristics K which are specific to the metal belt 1. An evaluation of the measurement signals MA that is optimized for the respective metal belt 1 is possible through the use of the characteristic K. The evaluation by means of a Goertzel algorithm delivers superior results with reduced computing effort.

Although the invention has been illustrated and described in detail by means of the preferred example embodiment, the invention is not limited by the disclosed examples and other variants may be derived therefrom by the person skilled in the art without departing the protective scope of the invention.

REFERENCE SIGN LIST

1 Metal belt
2 Front device
3 Rear device
4 Reel
5 Deflection roller
6 Measuring assembly
7 Mechanical excitation device
8 Double arrow
9 Suction fan
10 Section openings
11 Suction channel
12 Modulator element
13 Boundary surface
14 Metal plate
15, 18 Upper side
16 Sensor elements
17 Cover
19 Sensors
20 Excitation coil
21, 32 Receptacles
22 Indents
23 Cooling medium
24 Inlets
25 Outlets
26 Channels
27 Bushing
28 Fixing element
29 Plastic hood
30 External thread
31 Color
33 Support ring
34 Evaluation device
35 Digitization devices
36 Cable
37 Armored cable
38 Prefabricated connections
39 Lines or thin cables
40, 42 Plug-in connections
41 Lines of the armored cable
43 Armoring
44, 45 Codings
46 Linearization block
47 Determination device
48, 49 Determination blocks
A Amplitudes
C Chemical characteristics
f, f1 to f3 Operating frequencies
A Excitation frequency
G Geometric characteristics
H History
IA Excitation current
K Characteristics
L Line
MA Analog measurement signal
MA' Transmitted signals
MA" Modified signals
PF Flatness error
T Thermodynamic characteristics
T' Operating temperature
x Transport device

The invention claimed is:

1. A measuring assembly in a transport device for a metal belt,
  wherein the measuring assembly is arranged between a front device and a rear device arranged downstream of the front device of the transport device,
  wherein the measuring assembly has a mechanical excitation device by means of which the metal belt is excitable in its thickness direction at an excitation frequency (fA) to produce a mechanical vibration,
  wherein the measuring assembly has a plurality of sensor elements,
  wherein the sensor elements are arranged offset in relation to one another when viewed in the width direction of the metal belt,
  wherein an analog measurement signal (MA) which is characteristic of the amplitude (A) of the excited mechanical vibration of the respective region of the metal belt is detectable in each case by means of the sensor elements for a plurality of regions of the metal belt which are offset in relation to one another in the width direction,
  wherein digitization devices are arranged inside the measuring assembly, by means of which the detected analog measurement signals (MA) are digitized and of which the digitized measurement signals or signals derived therefrom are transmitted as transmitted signals (MA') to an evaluation device arranged outside the measuring assembly, and
  wherein the sensor elements comprise eddy current sensors, the eddy current sensors of sensor elements that are arranged directly adjacent to one another when viewed in the width direction are operated in each case at one of two or three operating frequencies (f1, f2, f3) which differ from one another, and that the number of sensor elements is greater than the number of operating frequencies (f1, f2, f3) so that, when the sensor elements are viewed as a whole, a plurality of sensor elements are operated in each case at the same operating frequency (f1, f2, f3).

2. The measuring assembly as claimed in claim 1, wherein the digitization devices are designed as elements which are separate from the sensor elements and which are connected to the sensor elements inside the measuring assembly via cables having a maximum length of 1 m.

3. The measuring assembly as claimed in claim 2, wherein the cables are hermetically sealed at the transition to the respective sensor element.

4. The measuring assembly as claimed in claim 2, wherein the digitization devices are arranged below a metal plate in which the sensor elements are arranged.

5. The measuring arrangement as claimed in claim 1, wherein the transmitted signals (MA') are transmitted to the evaluation device via a common armored cable having prefabricated connections.

6. The measuring assembly as claimed in claim 5, wherein the armored cable in each case comprises dedicated lines for the transmitted signals (MA') of the individual sensor elements or for the transmitted signals (MA') of groups of in each case a plurality sensor.

7. The measuring assembly as claimed in claim 1, wherein the sensor elements have a coding which is characteristic of the operating frequency (f1, f2, f3) of the respective sensor element.

8. A combination of a measuring assembly as claimed in claim 1, comprising an evaluation device, wherein the evaluation device, receives the transmitted signals (MA') from the digitization devices, determines the amplitude (A) of the excited mechanical vibration of the respective region of the metal belt on the basis of the transmitted signals (MA') for the respective range of the metal belt, and in determining the amplitudes (A), uses a characteristic (K) which is at least specific to the metal belt.

9. The combination as claimed in claim 8, wherein in addition, the characteristic (K) is also dependent on the operating temperature (T') of the sensor elements.

10. The combination as claimed in claim 8, wherein the evaluation device uses a Goertzel algorithm in determining the amplitude (A).

11. The combination as claimed in claim 10, wherein the evaluation device takes account of the excitation frequency (fA) within the Goertzel algorithm.

12. The measuring assembly as claimed in claim 1, wherein the digitization devices are designed as elements which are separate from the sensor elements and which are connected to the sensor elements inside the measuring assembly via cables having a maximum length of 50 cm.

13. The measuring assembly as claimed in claim 12, wherein the cables are hermetically sealed at the transition to the respective sensor element.

14. The measuring assembly as claimed in claim 12, wherein the cables are inseparably connected to their respective sensor element.

15. The measuring assembly as claimed in claim 2, wherein the cables are inseparably connected to their respective sensor element.

16. The measuring assembly as claimed in claim 15, wherein the cables have a maximum length of 50 cm.

\* \* \* \* \*